United States Patent
Hunter et al.

[11] Patent Number: 6,001,449
[45] Date of Patent: Dec. 14, 1999

[54] INSULATION PANEL WITH GETTER MATERIAL SUPPORT

[75] Inventors: Rick Cole Hunter, Friendswood; Martin L. Agrella, League City; Mary C. Le, Friendswood; Michael L. Oelke, Webster, all of Tex.

[73] Assignee: Oceaneering International, Inc., Houston, Tex.

[21] Appl. No.: 08/730,942

[22] Filed: Oct. 16, 1996

Related U.S. Application Data

[63] Continuation-in-part of application No. 08/682,933, Jul. 8, 1996, Pat. No. 5,792,539.

[51] Int. Cl.⁶ .................................................... B32B 1/04
[52] U.S. Cl. .............................. 428/68; 428/76; 428/192
[58] Field of Search ............................. 428/68, 172, 182, 428/76, 192, 913; 52/576, 788.1

[56] References Cited

U.S. PATENT DOCUMENTS

| | | | |
|---|---|---|---|
| 822,848 | 6/1906 | Kunz | 428/182 |
| 2,342,839 | 2/1944 | Byers | 428/182 |
| 3,525,661 | 8/1970 | Jackson | 428/45 |
| 4,055,268 | 10/1977 | Barther | 220/9 C |
| 4,513,041 | 4/1985 | Delluc | 428/69 |
| 4,579,756 | 4/1986 | Edgel | 428/34 |
| 4,783,356 | 11/1988 | Kueelmann | 428/69 |
| 4,791,773 | 12/1988 | Taylor | 52/790 |
| 4,837,388 | 6/1989 | Kugelmann | 428/69 |
| 5,018,328 | 5/1991 | Cur et al. | 220/420 |
| 5,032,439 | 7/1991 | Glicksman et al. | 428/44 |
| 5,082,335 | 1/1992 | Cur et al. | 312/401 |
| 5,084,899 | 1/1992 | Rusek | 428/69 |
| 5,090,981 | 2/1992 | Rusek, Jr. | 65/4.4 |
| 5,107,649 | 4/1992 | Benson et al. | 52/309.4 |
| 5,157,893 | 10/1992 | Benson et al. | 52/792 |
| 5,252,408 | 10/1993 | Bridges et al. | 428/621 |
| 5,271,980 | 12/1993 | Bell | 428/68 |
| 5,330,816 | 7/1994 | Rusek | 428/69 |
| 5,376,424 | 12/1994 | Watanabe | 428/69 |
| 5,398,510 | 3/1995 | Gilley et al. | 62/3.6 |
| 5,399,408 | 3/1995 | Nowara | 428/73 |
| 5,445,857 | 8/1995 | Nawobilski | 428/69 |
| 5,505,046 | 4/1996 | Nelson et al. | 62/3.6 |
| 5,522,216 | 6/1996 | Park et al. | 62/3.6 |

*Primary Examiner*—Donald Loney
*Attorney, Agent, or Firm*—Kurt S. Myers

[57] ABSTRACT

The present invention is directed to an insulation panel having an envelope made of at least two pieces, an upper portion and a lower portion, of a high gas barrier material, preferably one of which is a thin skin of liquid crystal polymer, which surrounds a thermal insulation barrier which supports said envelope, the envelope is evacuated and has sealed edges; and a "getter" material within said envelope. The present invention is further directed to a "getter" material supporting structure which comprises an air lock chamber with an opening which when open permits the gases surrounding the barrier in the envelope after evacuation access to the "getter" material.

7 Claims, 12 Drawing Sheets

INSULATION PANEL WITH GETTER MATERIAL SUPPORT

RELATED APPLICATION

This application is a continuation-in-part application of U.S. patent application Ser. No. 08/682,933, filed Jul. 8, 1996, entitled "INSULATION BARRIER" now U.S. Pat. No. 5,792,539.

FIELD OF THE INVENTION

The present invention is directed to a unique thermal insulation panel. More specifically, the present invention is directed to an evacuated envelope or vacuum panel having a rigid outer skin of an impermeable thermoplastic. Further, the present invention is directed to a thermal insulation panel having an air lock chamber for supporting "getter" material positioned within the envelope or panel which may be replaced when necessary.

BACKGROUND OF THE INVENTION

U.S. Pat. No. 4,055,268 discloses a double walled cryogenic storage container with a vacuum space containing multi-layer insulation comprising thin radiation layers separated by permanently precompressed fiber sheets.

U.S. Pat. No. 4,513,041 discloses insulating panels in which evacuated cells are inserted. Each vacuum cell is composed of a rigid plastic tube, both ends of which are closed by perforated plugs, and the tube placed in a thin flexible sheath of highly impervious plastic material. This sheath extends beyond both ends of the rigid tube and is sealed by welding after the rigid tube has been evacuated to a high vacuum.

U.S. Pat. No. 4,579,756 discloses an insulating sheet material made of a plurality of air tight chambers, each having a partial vacuum therein, held together in closely spaced side-by-side relationship so as to form a sheet of such compartments.

U.S. Pat. Nos. 4,783,356 and 4,837,388 disclose an article of insulation which has outer sheet-like elements of elastic material secured by adhesive to a rigid deformable material as an inner element and deforming in a particular pattern, following which the inner element retains its deformed shape while the outer elements spring back to their original shape, leaving voids in which there is a partial vacuum.

U.S. Pat. No. 4,791,773 discloses a pair of panel sheets which form a sandwich with an undulated ribbon-like spacer in the interior thereof and marginal spacers about the periphery of the sheets. A vacuum within the space between the marginal spacers insulates and rigidifies the assembly.

U.S. Pat. No. 5,018,328 discloses a vacuum insulation panel having flexible gas impermeable walls formed in multiple substantially adjacent compartments. Multiple compartments are utilized to enhance the long term thermal characteristics of the panel by "protecting" the vacuum characteristics of at least one of the compartments by surrounding it with additional evacuated compartments. This results in a very minimal gas pressure gradient across the internal walls forming the internal compartment to minimize gas and vapor permeation into it, thus greatly enhancing the lifetime of the panel. Further, this permits strategic placing of gettering materials such that gettering materials absorbing certain gases can be placed in the outer compartments and other gettering materials absorbing different gases can be placed in the internal compartments to enhance the lifetime of the panel.

U.S. Pat. No. 5,032,439 discloses thermal insulation vacuum panels formed of an inner core of compressed low thermal conductivity powders enclosed by a ceramic/glass envelope evacuated to a low pressure.

U.S. Pat. No. 5,082,335 discloses a refrigeration appliance having a vacuum insulation system wherein a combination of vacuum thermal insulation panels and polyurethane foam provide the thermal insulating properties as well as structural support.

U.S. Pat. No. 5,090,981 discloses a method for making high R superinsulation panels; U.S. Pat. No. 5,094,899 discloses an insulation panel which comprises a mineral fiber board, the fibers having no organic binder thereon, and particulate material packed in the interstices of the board and a gas tight envelope encapsulating the board, the envelope being evacuated; and U.S. Pat. No. 5,330,816 discloses a superinsulation panel.

U.S. Pat. Nos. 5,107,649 and 5,157,893 disclose an ultra-thin compact vacuum insulation panel comprised of two hard but bendable metal wall sheets closely spaced apart from each other and welded around the edges to enclose a vacuum chamber. Glass or ceramic spacers hold the wall sheets apart.

U.S. Pat. No. 5,252,408 discloses a vacuum insulated panel formed of peripherally welded metallic wall members which define a cavity within which a solid compressed block of a particulate material is disposed. The particulate material, preferably an activated carbon black, a silica gel or a combination thereof, serves as a barrier to radiant thermal transmission through the panel, acts as a getter to maintain the vacuum in the cavity, and, with proper density, supports the walls of the panel against collapse when the cavity is evacuated.

U.S. Pat. No. 5,271,980 discloses a flexible insulating panel which comprises a first flexible external sheet opposing a second flexible external sheet, each sheet comprises a plurality of corrugated gas impermeable layers joined with a gas tight seal to form an internal space that is evacuated of air. Spacers press against a membrane to resist the facewise compressive forces. The evacuated insulating panel is flexible, both in use and application.

U.S. Pat. No. 5,376,424 discloses a thermal insulating material which is packed in a sealing bag composed of an obverse face material and a reverse face material, each made of a metal foil, and which is sandwiched by a sealant layer of plastic film adhesively affixed to one side thereof and by a surface layer of plastic film adhesively affixed to the other side thereof.

U.S. Pat. No. 5,398,510 discloses a superinsulation panel and a thermoelectric assembly which maintains the temperature within a refrigerator or other type of enclosed structure at a desired value.

U.S. Pat. No. 5,399,408 discloses a thermal insulating body for thermal insulation, consisting of a shell which can be evacuated and which is filled with a solid, microporous thermal insulating material.

U.S. Pat. No. 5,445,857 discloses vacuum insulating panels which are provided with textured surfaces that localize thermal expansion.

U.S. Pat. No. 5,505,046 discloses apparatus including a power supply and control system to provide for maintaining the temperature within an enclosed structure using thermoelectric devices.

U.S. Pat. No. 5,522,216 discloses a refrigerator which combines the benefits of superinsulation materials with thermoelectric devices and phase change materials to provide an environmentally benign system that is energy efficient and can maintain relatively uniform temperatures for extended periods of time with relatively low electrical power requirements.

SUMMARY OF THE INVENTION

The present invention is directed to an insulation panel having an envelope made of at least two pieces, an upper portion and a lower portion, of a high gas barrier material, preferably one of which is a thin skin of liquid crystal polymer, which surrounds a thermal insulation barrier which supports said envelope, the envelope is evacuated and has sealed edges; and a "getter" material within said envelope. The present invention is further directed to a "getter" material supporting structure to enable replacement of the "getter" material when necessary which comprises an air lock chamber with an opening which when open permits the gases surrounding the barrier in the envelope after evacuation or which permeates the barrier over time access to the "getter" material.

DESCRIPTION OF THE PREFERRED EMBODIMENTS

Figures 1, 1A:
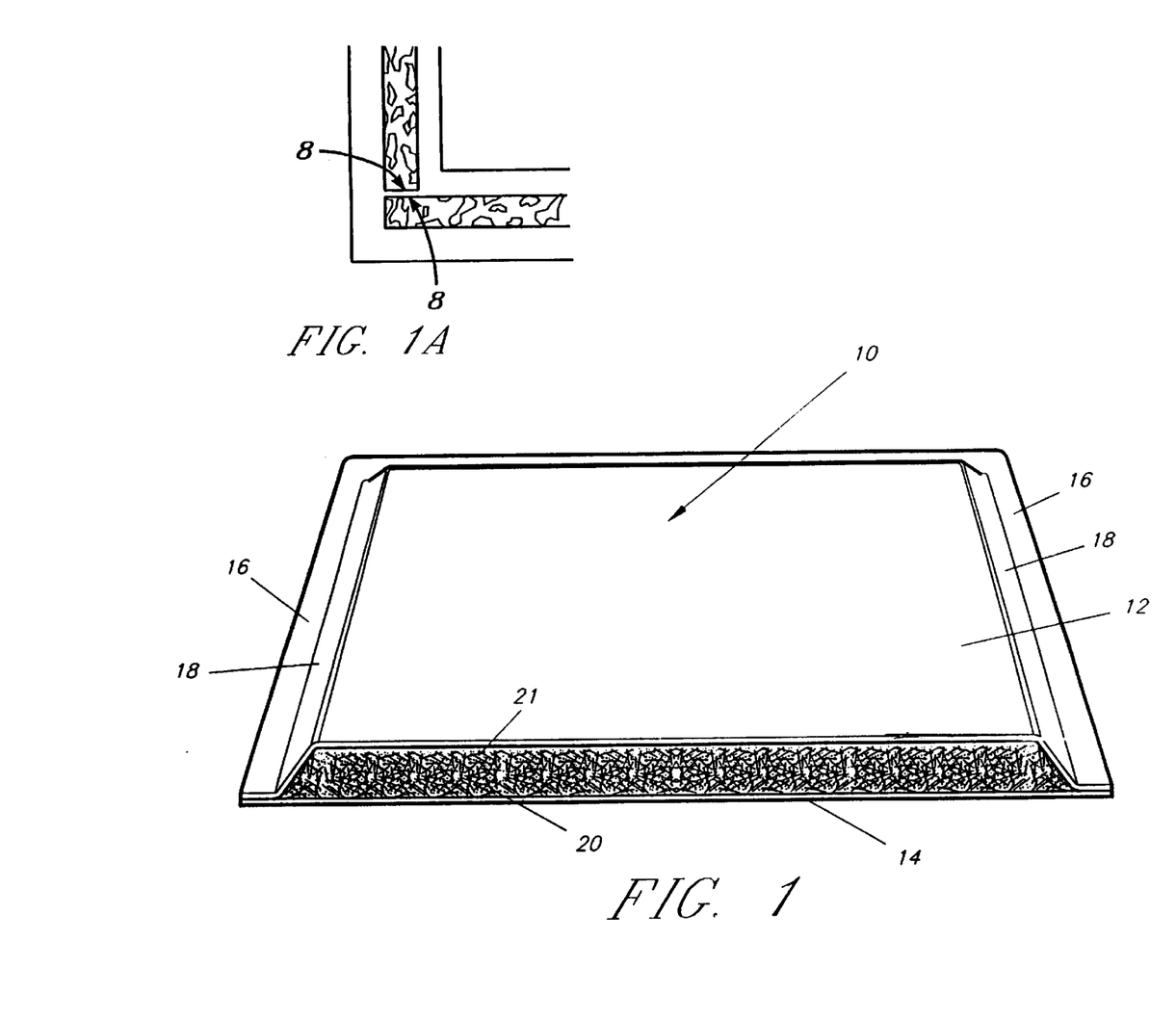
FIG. 1 is an isometric cross-sectional view of a panel of one embodiment of the present invention with a barrier of fibers or fibers and powder.
FIG. 1A is a cross-sectional view of two of four panels of the prior art forming the insulation for a box.

Referring now to FIG. 1, a panel 1 of the present invention has an envelope 10, preferably made of an upper outer skin 12 and lower outer skin 14, surrounding a thermal insulation barrier 20. In making a panel 1, the outer skins 12 and 14 are formed to extend beyond the thermal insulation barrier 20, forming the envelope 10 around the thermal insulation barrier 20, and providing sealing edges 16 to seal the envelope 20. The thermal insulation barrier 20 supports and maintains the envelope 10 of outer skins 12 and 14 from collapsing on each other when the panel 1 is evacuated. Each panel 1 has a definite size and an outer sealing edge 16 which may have various configurations. The panel as shown in FIG. 1 shows a sealing edge 16 which is the bringing together of a formed three dimensional upper skin 12 and a flat lower skin 14. The sealing edges 16 are sealed using an adhesive, by thermal welding or by metallic plating and soldering.

When the sealing edge 16 is sealed with an adhesive, the adhesive thickness is preferably controlled by a ridge or small step around the perimeter of the panel edge produced during the skin forming operation. The panel 1 may also be injection molded in two pieces of the desired size and shape and the thermal insulation barrier 20 will be sized and shaped to be inserted into and fill the cavity. The two pieces may then be sealed by using an adhesive, by thermal welding or by metallic plating and soldering.

The outer skins 12 and 14 of the panel 1 are preferably a liquid crystal polymer. These new thermoplastics are aromatic copolyester thermoplastic polymers that exhibit a highly ordered structure in both the melt and solid states. Known liquid crystal polymers, described in U.S. Pat. No. 4,161,470, incorporated herein by reference, are the Vectra A and C resins, a wholly aromatic polyester based on poly(benzoate-naphthoate), and the Vectra B resin, a wholly aromatic copolyester-amide based on polynaphthoate-aminophenotere-phthalate, all of Hoechst Celanese; the Zenite resins, described only as based on aromatic polyesters, of DuPont Chemical Company; and the Xydar resins, a terpolymer of terephthalic acid, p-hydroxybenzoic acid and p,p'-bisphenol linked by ester bonds, of Amoco Chemical Company. These polymers exhibit both low thermal conductivity and low permeability (which means they are high gas barrier materials), making them desirable and suitable for the outer skin of a panel 1. The use of thermoplastic materials as the formed skins 12 and 14 are preferable because of their low thermal conductivity which materially reduces the thermal edge (the edge exposed to thermal differential) 18 heat loss effect of the panel 1 especially as compared to panels with metal skins. A panel 1 with thermoplastic skins of a thickness to provide comparable structural support may have edge losses from 2 to over 6 times less than a metal skinned panel. The effect this edge effect has on the entire panel, or enclosure, depends on the overall size of the panel. Smaller panels and enclosures can pay a high penalty for this thermal edge loss and greatly diminish the high R value which may exist in the center of the panel.

One aspect of the present invention therefore is the ability to form skins of liquid crystal polymers for making the envelope of a thermal insulation panel. As illustrated in FIG. 1, an insulation barrier 20 made of fibers and particles 21 as disclosed in U.S. Pat. No. 5,094,899 is surrounded by an envelope 10 made of formed liquid crystal polymers. The envelope 10 is shown to have a formed upper skin 12 and a flat lower skin 14; however, the skins 12 and 14 may have any configuration of size and shape. The advantage of the panel 1 of the present invention over the panel shown in the '899 is that the panel of the present invention has substantially less thermal edge losses. The envelope of the panel disclosed in the '899 is a thin layer of metal foil which has substantial edge losses when the thermal edges (8 in the panels of the prior art illustrated in FIG. 1A) are in contact with the ambient temperature conditions. The panels 1 of the present invention have edge losses 2 to over 6 times less than the metal foil due to the substantially lower thermally conductive material, i.e. a liquid crystal polymer. While not shown in FIG. 1, the panel has a "getter" material in the panel, which will be shown in detail hereinafter, which is a material to absorb the gasses which remain in the voids of the barrier 20 even after being evacuated or the gasses which permeate the skins of the panel. These "getter" materials are solids which work by physical adsorption, chemical adsorption or absorption to trap or "get" the gases in the evacuated space. Typical thermally conductive gases which remain or permeate the envelope over time include water vapor, hydrogen, nitrogen, oxygen, carbon monoxide or dioxide and other gases found in the atmosphere or released during the fabrication process which when present in the panel are thermal conductors. Typical getter materials are alloys of zirconium and iron (e.g. St 707, a trademark of SAES Getters/U.S.A., Inc.) designed to sorb hydrogen, oxygen, water, carbon monoxide or dioxide and nitrogen. Preferred getter materials for a polymer skin panel are the COMBO SUPERGETTER or SUPERGETTER, products of SAES Getters/U.S.A., Inc., which is a barium lithium alloy alone or combined with barium oxide and either a palladium or cobalt oxide.

Figure 2:
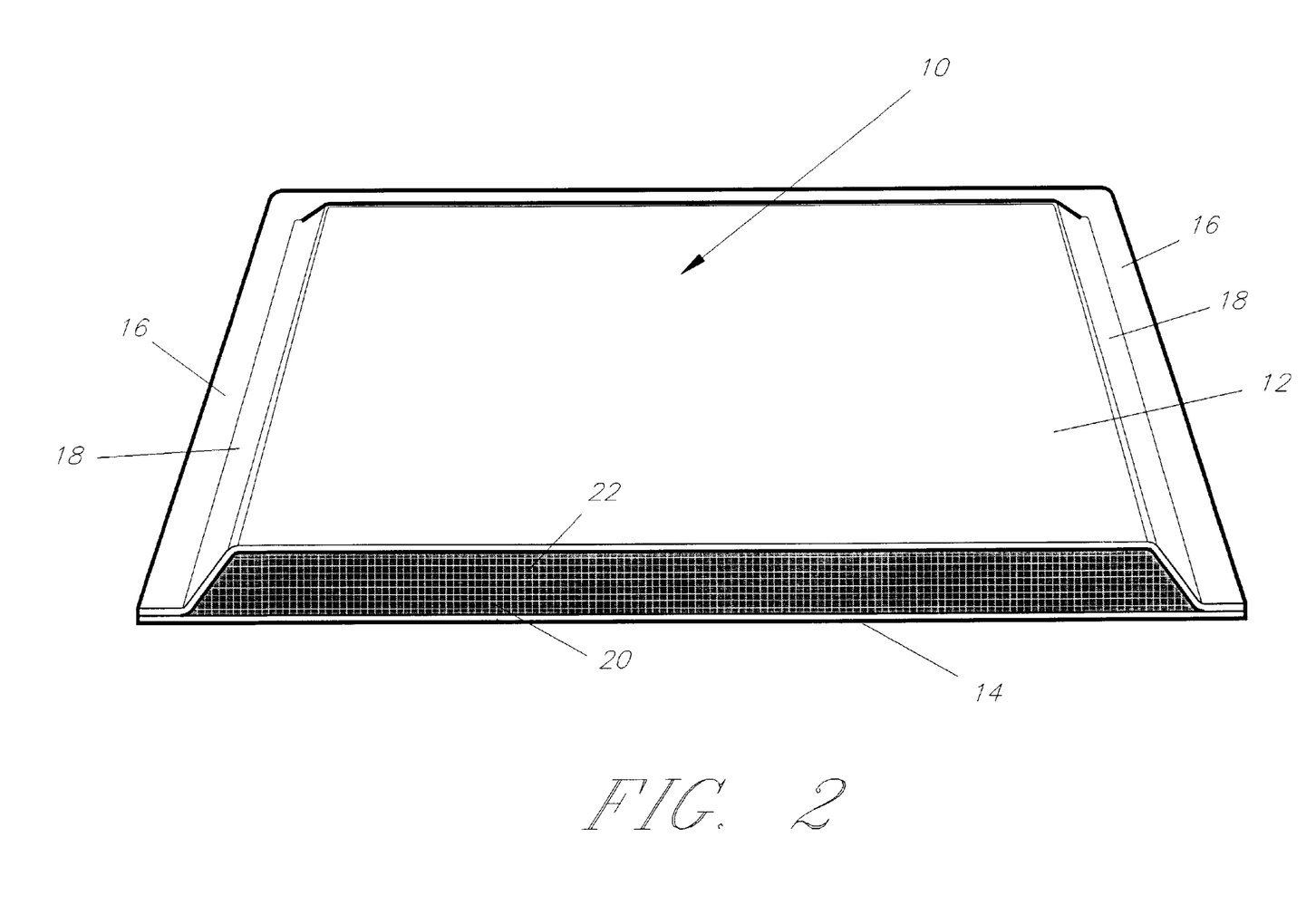
FIG. 2 is an isometric cross-sectional view of a panel of another embodiment of the present invention with a barrier of powder.
Figure 3:
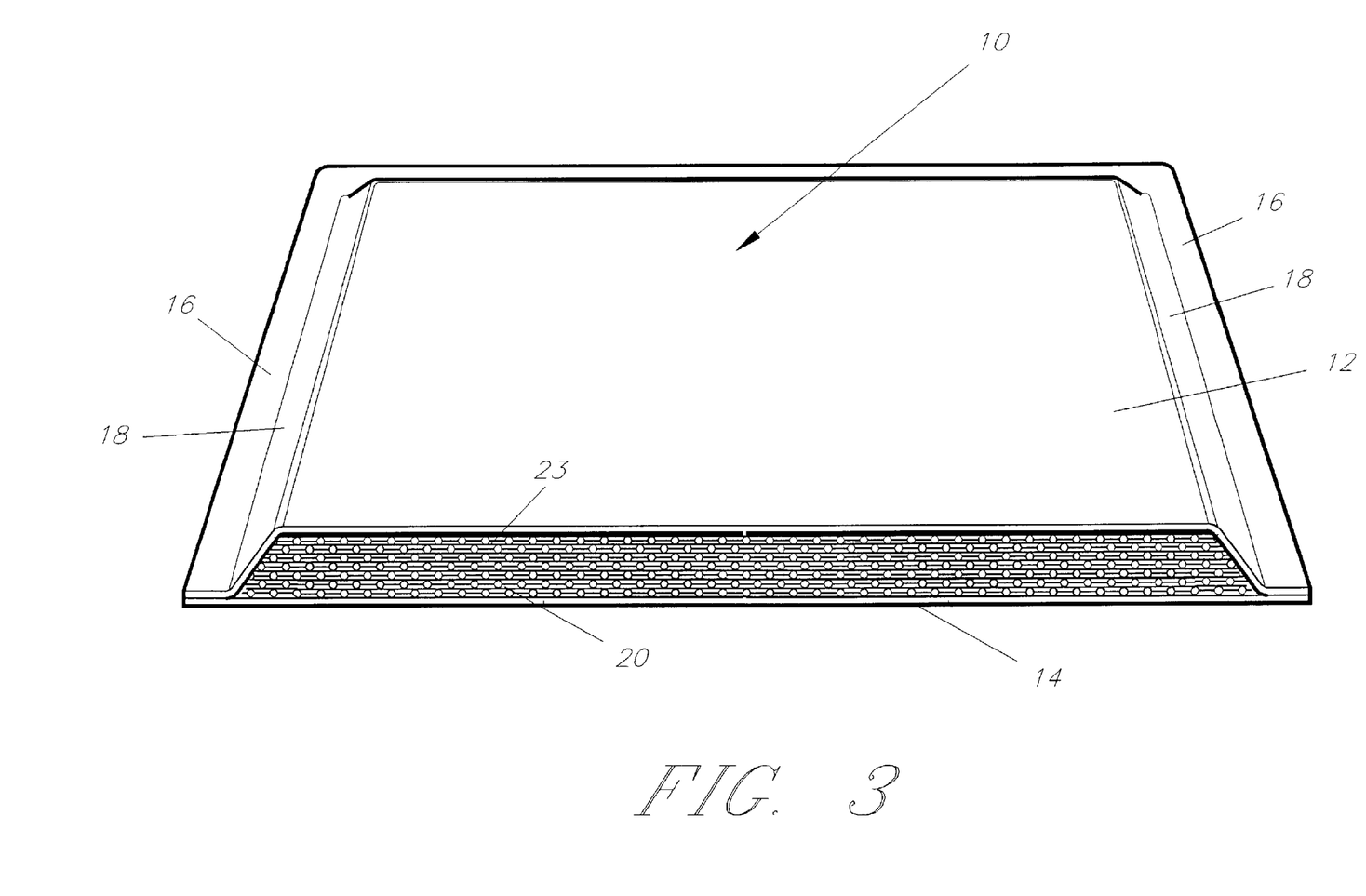
FIG. 3 is an isometric cross-sectional view of a panel of another embodiment of the present invention with a barrier of glass or plastic spheres.
Figure 4:
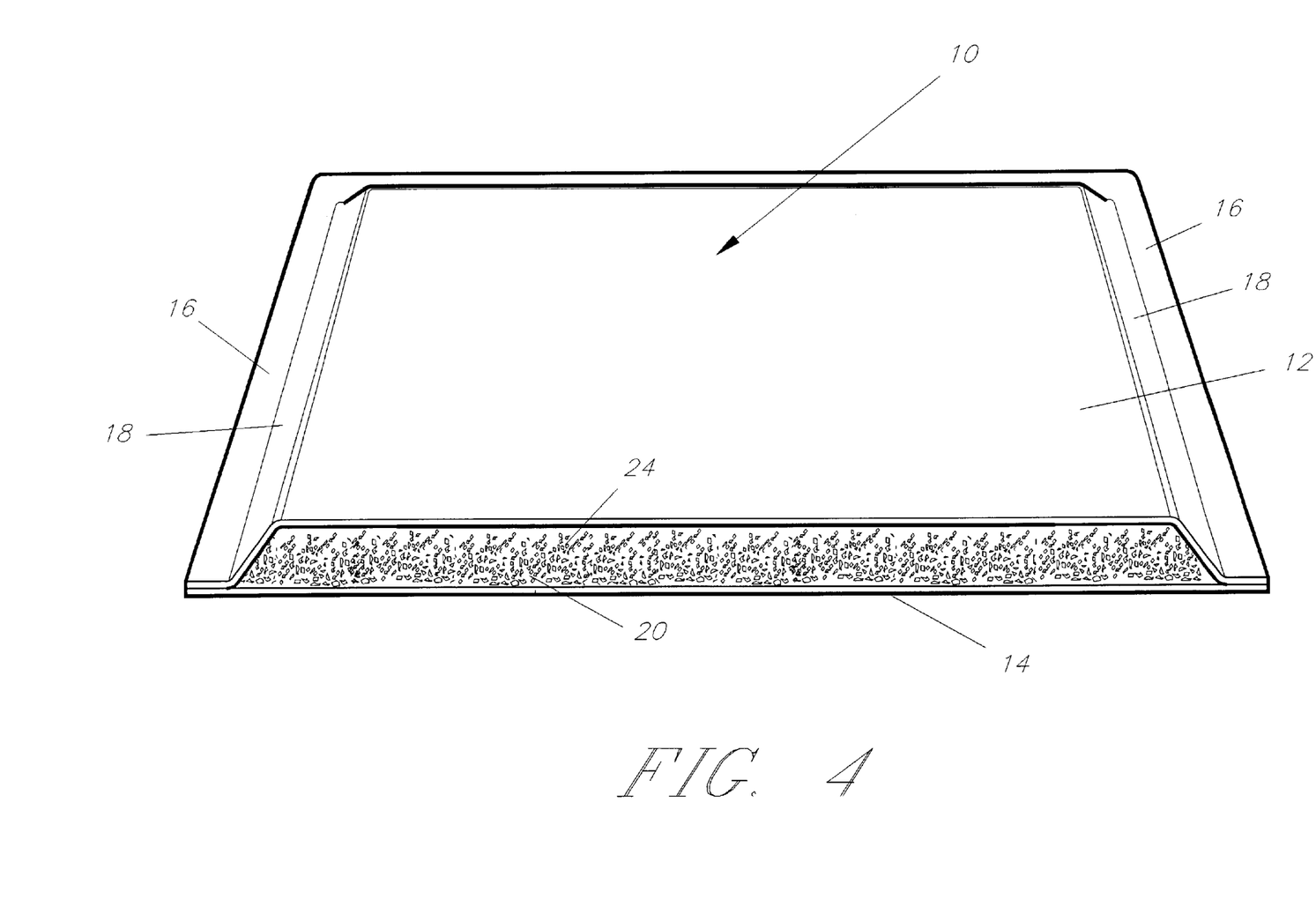
FIG. 4 is an isometric cross-sectional view of a panel of another embodiment of the present invention with a barrier of open cellular material.

The use of a skin of liquid crystal polymer as at least one of the skins of an envelope 10 of a panel 1 may be employed with barriers 20 where the barrier 20 is made of compacted powders 22 as illustrated in FIG. 2; where the barrier 20 is made of glass or plastic balls or spheres 23 as illustrated in FIG. 3; where the barrier 20 is made of open-cell materials 24 such as cork, foamed thermoplastics or ceramics, xerogels, or composite materials as illustrated in FIG. 4. The high gas barrier of the liquid crystal polymer envelope 10 together with the "getter" material provides a long life to the vacuum in the panel 1, thus providing a high efficiency thermal insulation panel over years of time.

Figure 5:
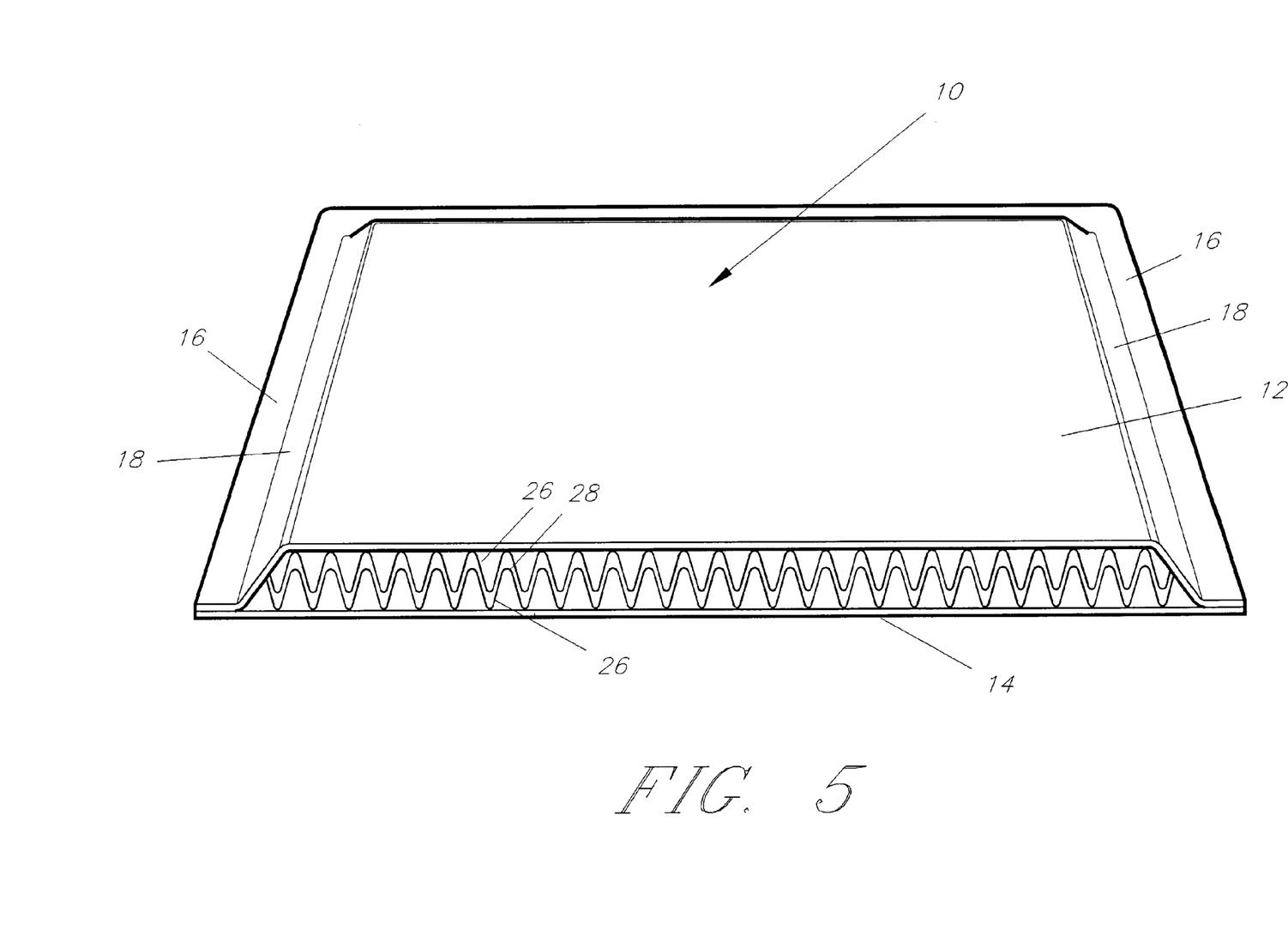
FIG. 5 is an isometric cross-sectional view of a panel of preferred embodiment of the present invention with a barrier made of alternating stacking insulation elements.

Now referring to FIG. 5, a preferred barrier 20 is illustrated. This preferred barrier is fully described in U.S. patent application Ser. No. 08/682,933, filed Jul. 8, 1996, entitled "INSULATION BARRIER", which is incorporated herein by reference. The unique feature of the thermal insulation barrier of the present invention is that the barrier 20 is made of alternating stacking thermal insulation elements. There are therefore several different, at least two, thermal insulation elements 26 and 28 used to make the thermal insulation barrier 20 of the present invention. For the purpose of this application, "stacking" requires that two adjacent insulation elements each have a corresponding three dimensional design which fit one within the other but which provides a minimal surface contact between the two elements as contrasted to "nesting" where two products having corresponding three dimensional designs, e.g. DIXIE cups, Dixie being a registered trademark of the James River Corporation, when placed one within the other have substantial contact between the surfaces of the adjacent cups. Stacking occurs when the elements have corresponding but different designs rather than the same or identical designs. The preferred thermal insulation barrier is made with a pair of thermal insulation elements, one element having a specific three dimensional design and the second element having a corresponding three dimensional design which causes stacking of the two adjacent elements.

An exceptional thermal insulation barrier must address the three types of heat transfer which a barrier encounters; namely, convection, conduction and radiation. Most of the prior art insulation systems address one or two but not all three types of heat transfer which a thermal insulation barrier encounters. Furthermore, when systems use vacuum (low vacuum, $10^{-3}$ torr or higher pressure; high vacuum, $10^{-3}$ torr or lower pressure), the thermal insulation barrier used to separate and maintain separation of the outside skin of the gas barrier material also has to carry the atmospheric pressure load. The thermal insulation barriers of the present invention address all forms of heat transfer and the load requirements of an exceptional insulation barrier.

As with most insulation barriers, the thermal insulation barrier of the present invention is used to fill a space between the hot and cold surfaces and in filling that space reduces the heat transfer by convection of the gases in that space. Heat transfer by convection requires a movement of the fluid (gases) in contact with a surface. One aspect of the present invention is that the size of any gas space within the insulation barrier may be very small reducing the movement of the gases. Convective heat transfer is further minimized by the removal of gases from the space, i.e. by evacuation. Any such vacuum system requires a structure to support the differential pressure between the atmospheric outside pressure and the internal reduced pressure. Solid conductive heat transfer is minimized by extending the length of the heat length path. Radiant heat transfer is minimized by using multiple layers of heat reflective surfaces. It is to be understood that when the space between surfaces is described as being evacuated, the space is specifically in reference to the space within a panel.

The cumulative parameters as chosen above can produce a thermal insulation barrier of the present invention which has an R value (the standard rating of insulation), excluding any edge effect, of three to ten times higher than the best known insulation systems. It is clear therefore that the unique thermal insulation barriers of the present invention address all four parameters of an exceptional insulation barrier and are better than any known prior art thermal barrier.

In the FIG. 5 embodiment, the thermal insulation elements used to make the thermal insulation barrier 20 of the present invention are made of a structural material with a highly emittant surface formed into a geometric shape having a repetitive three dimensional design which permits stacking.

Figure 6:
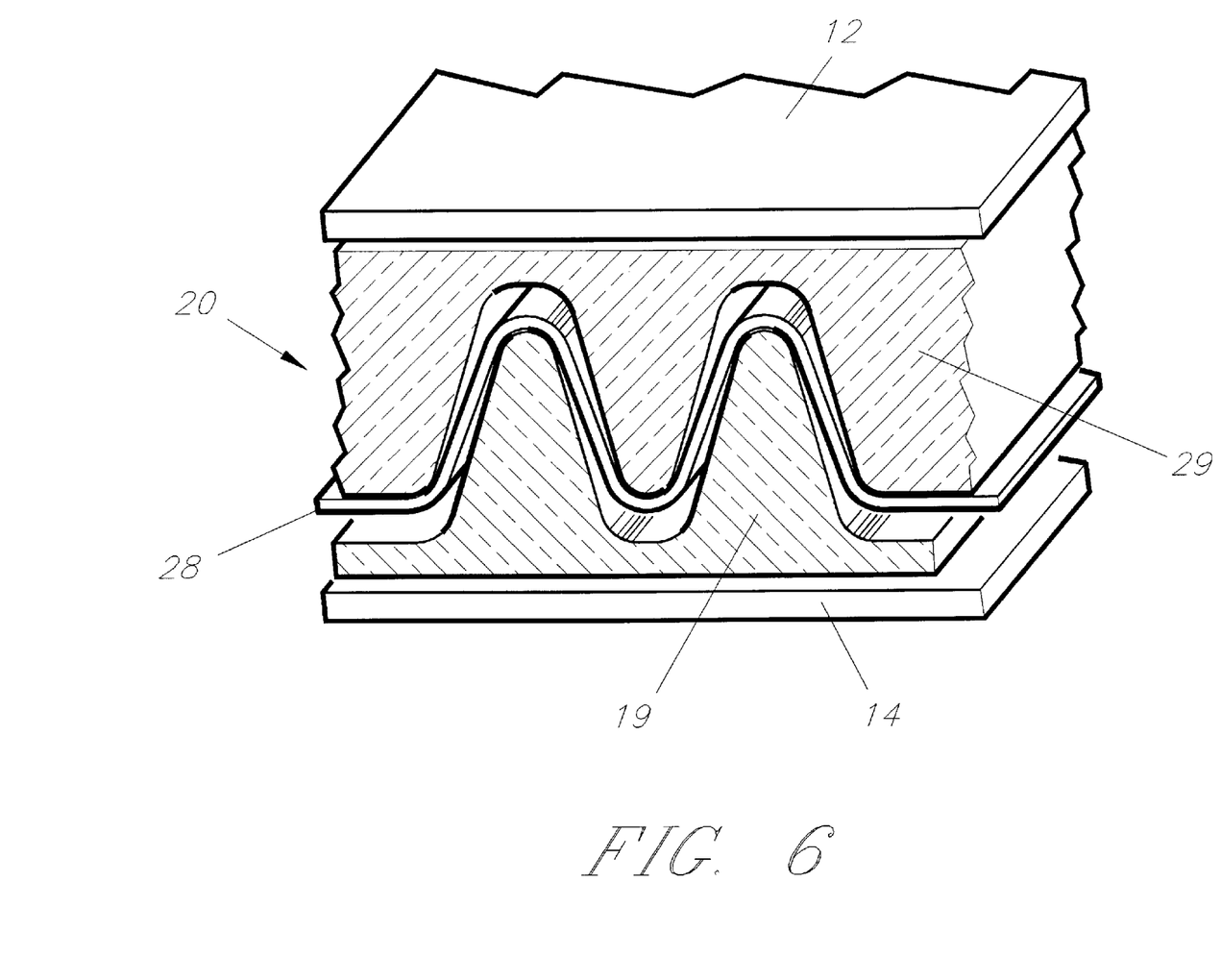
FIG. 6 is an isometric cross-sectional view of a panel of another embodiment of the present invention with a barrier using thermal insulation elements that have a three dimensional design on only one surface.

In the FIG. 6 embodiment of the present invention, the top and bottom elements of the barrier 20 are not uniform in thickness as the other elements used in the barrier and need not have a highly emittant surface. In this embodiment of the barrier 20, an element 29 is used which has the three dimensional design on only one surface, the element not being a thin sheet material, and has a substantial cross-sectional area. The thermal insulation elements 29 are made of a solid, formable, open structured material, such that entrapped gasses may be evacuated, such as open celled polyurethane from ICI, open celled ceramic foams, xerogels, glass/ceramic fiber composites such as Fiberfrax Duraboard 2600, a product of the Carborundum Company, compacted powders such as silica with appropriate binders and formed stainless steel wire mesh. These solid, open structured materials may be formed as a long block which then is cut to form the three dimensional design on one surface or are molded to form the desired three dimensional design. The design may have the same design as a compression element or a tension element to be used in making the barrier 10 of the present invention.

Figure 7:
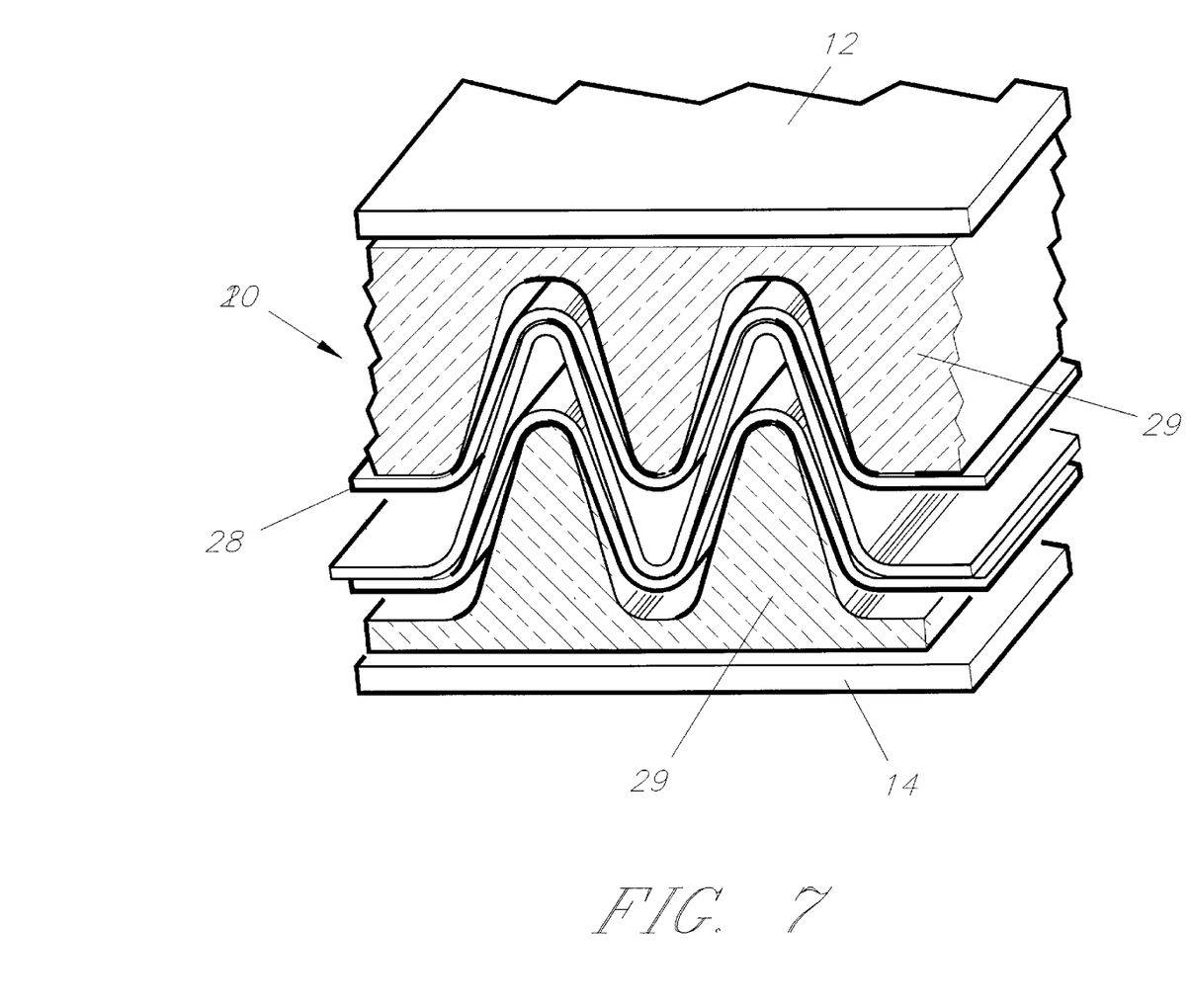
FIG. 7 is an isometric cross-sectional view of a panel of another embodiment of the present invention with a barrier using thermal insulation elements that have a three dimensional design on only one surface and alternating stacking insulation elements.

An improved barrier 20 will have a greater number of alternatively "stacked" complimentary thermal insulation elements as illustrated in FIG. 7. The repetitive three dimensional design of alternatively "stacked" thermal insulation elements is not identical but are complimentary. Two different thermal insulation elements are "complimentary" when the repetitive three dimensional design of the alternate elements cause "stacking", not nesting, and lock movement of adjacent thermal insulation elements in at least one of the directions 90° to the stacking direction.

The complimentary elements are preferably alternately placed in the barrier; however, when more than one thermal insulation element is nested in a barrier, the nested elements are not considered alternate elements in the barrier but are considered equivalent to a single element of the combined thickness of the nested elements. Nested elements may be used at the top and bottom of the thermal insulation barrier to increase strength without the addition of any significant addition of height to the barrier.

The panels 1 which employ the preferred barriers 20 illustrated in FIGS. 5 to 7 preferably have an envelope 10 made of at least two pieces, an upper portion and a lower portion, of a high gas barrier material, preferably one of which is a thin skin of liquid crystal polymer. Thus the skins 12 and 14 which surrounds the thermal insulation barrier 20 which supports the envelope 10 or the skin 12 or 14 are both preferably made of a liquid crystal polymer. However, the thermal performance of the preferred barriers of the present invention have been found to be so much better than known barriers that a high vacuum system may not be required. In the event a low vacuum system is used for the panel 1 or a shorter life panel is made, skins 12 and 14 of such a panel may be made of other thermoplastics such as high density polyethylene, poly-ethylene terephthalate copolyesters, polyetheramides, polyvinylidene fluoride or cross-linked high density polyethylene to produce a panel 10 of the present invention. It is recognized that these other thermoplastic materials may be more permeable than the preferred liquid crystal polymers; however, these other thermoplastic materials may be coated by a metal, thin ceramic films or a polymeric coating to form a less permeable composite skin. In a panel with a skin of greater gas permeability more getter material is used in the panel to maintain a suitable vacuum level. Furthermore, a layered composite of a high cost, high barrier film may be laminated to a low cost, low barrier film to achieve a skin for a lower cost and long life panel. The use of thermoplastic materials enables the two skins 12 and 14 to be joined to seal the edges 16 of the envelope they form by using an adhesive, by thermal welding or by metallic plating and soldering. This sealing operation may be done in a vacuum chamber.

Figure 8:
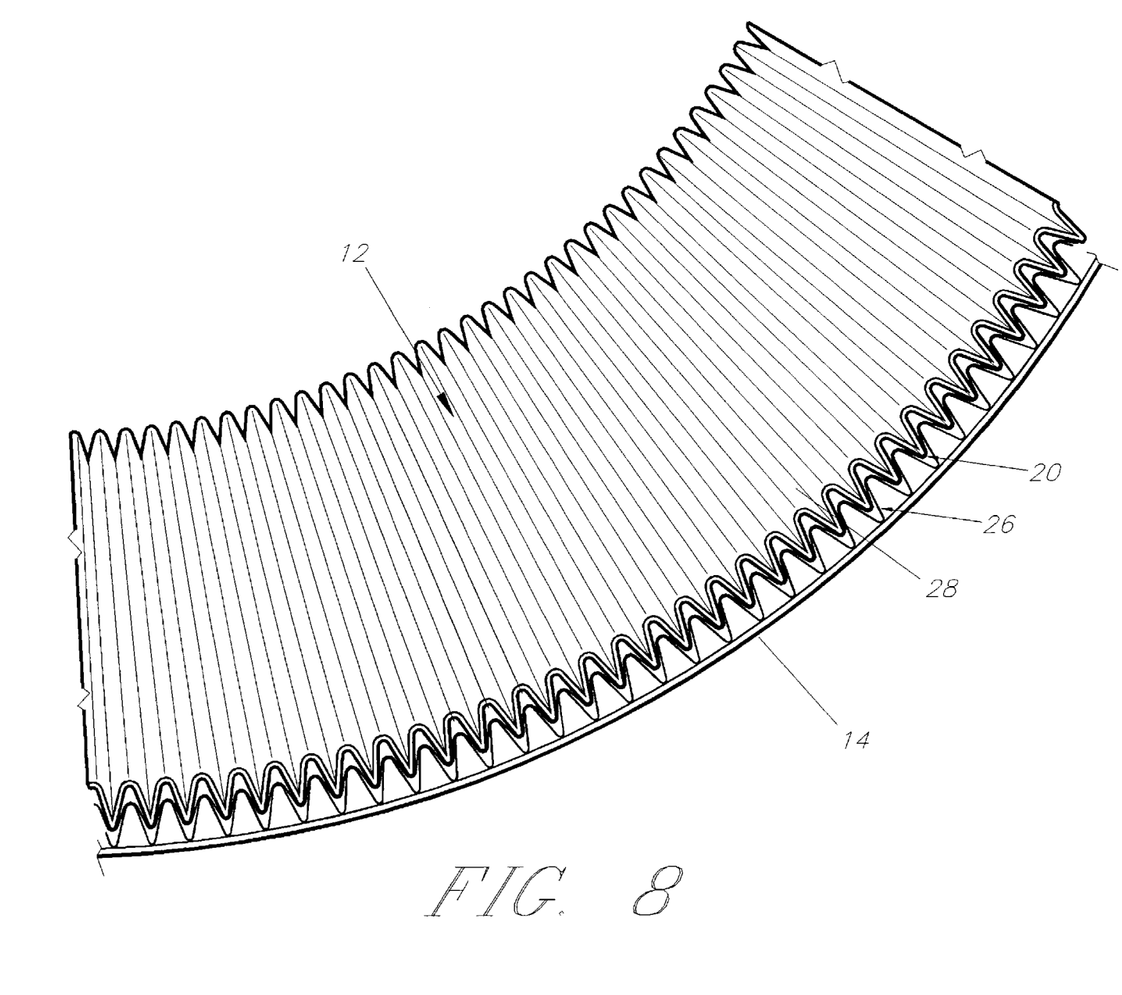
FIG. 8 is a panel where the envelope is made of a liquid crystal polymer which has a compatible three dimensional design with the insulation barrier.

Referring now to FIG. 8, an alternate design for a curved surface panel 1 is shown. In this embodiment the outer skin or surface 12 has the same three dimensional design as the top or outside thermal insulation element which is part of and forms the thermal insulation barrier 10. The design of the skin 12 in FIG. 8 is illustrated as the same beam-like design as a compression element; however, the design may be the same as a tension element. The only difference in skin 12 and the thermal insulation element of the thermal insulation barrier 20 is that the choice of material may be different and the thickness of the skin 12 may be greater than that of the corresponding element.

Figure 9:
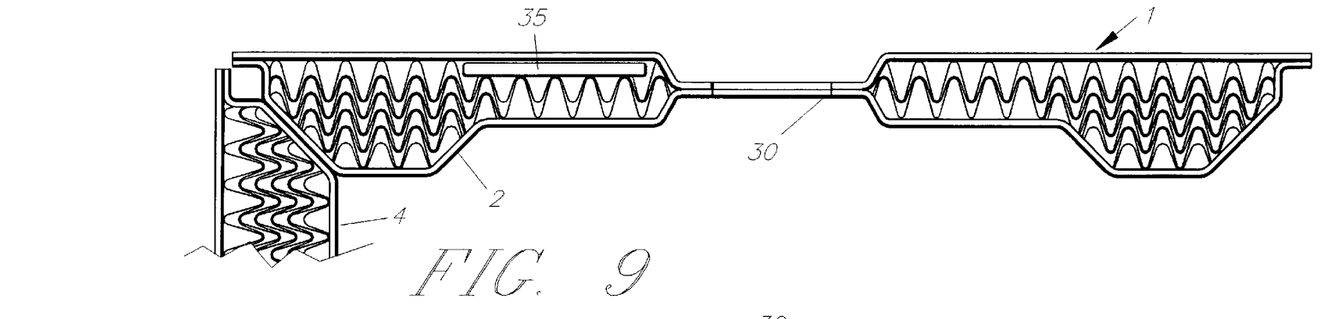
FIGS. 9, 10 and 11 are cross-sectional views of a panel with various designs of openings in the panel and each panel has a "getter element" in the panel.
Figure 10:
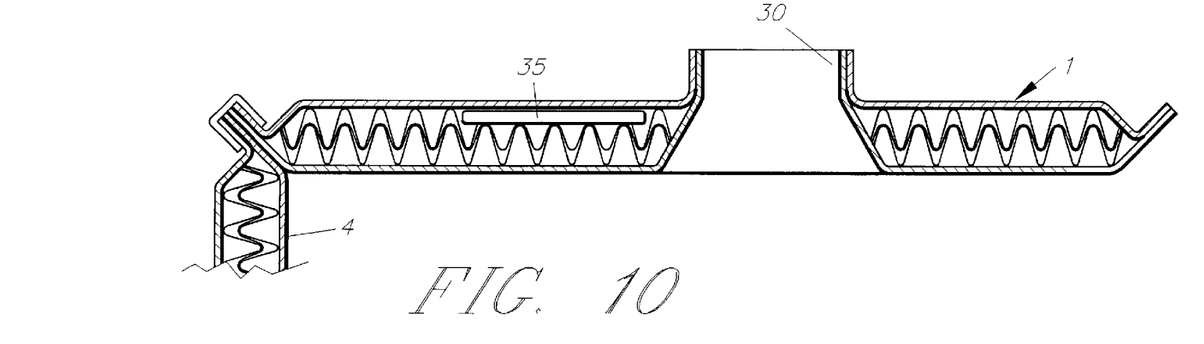
Figure 11:
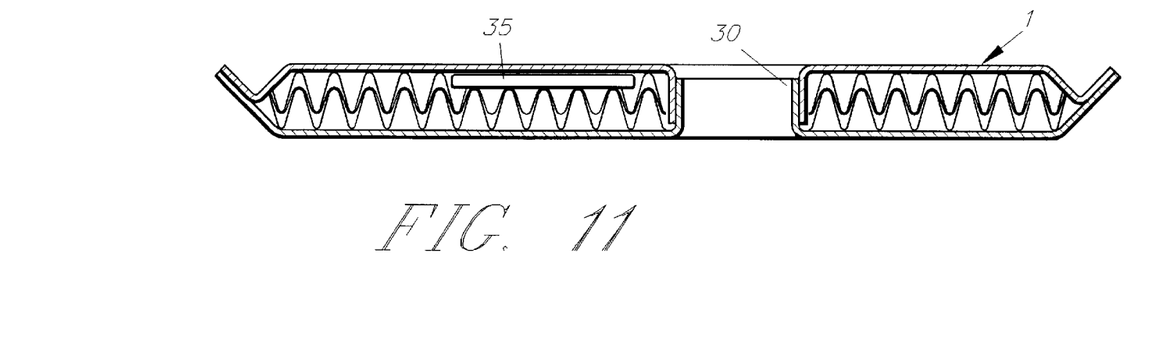

Referring now to FIGS. 9, 10 and 11, a panel 1 having an opening 30 is shown. The ability to make panels which provide exceptional thermal barriers with opening recognizes that most surfaces requiring insulation also have piping or electrical access openings or other irregularities in the surface. The configuration of the opening 30 is different in the three Figs. It is recognized that these openings or irregularities must deal with the piping or whatever is passing through these openings as a separate insulation problem. These Figs. also illustrate that one panel 2 may be connected to a second panel 4. While the connection is shown at right angle to the first panel 2, it is understood that the connection may be from 0° to 180°.

FIGS. 9, 10 and 11 also illustrate a panel 2 having a thermal insulation barrier 20 which supports a getter material 35. The desired materials for forming the panel 2 have low permeability to these gases; however, when the panel 2 is evacuated and has a life in years, it is desirable to use a getter material to trap any gases to maintain the vacuum in the panel 2. The preferred approach is to substantially eliminate the permeability of gases through the skins of the panels by the choice of material making panel 2 and using a getter material which traps the nitrogen, oxygen and other gases which over long periods time may permeate the surfaces 12 and/or 14 (or skins) of the panel 2.

Figure 12:
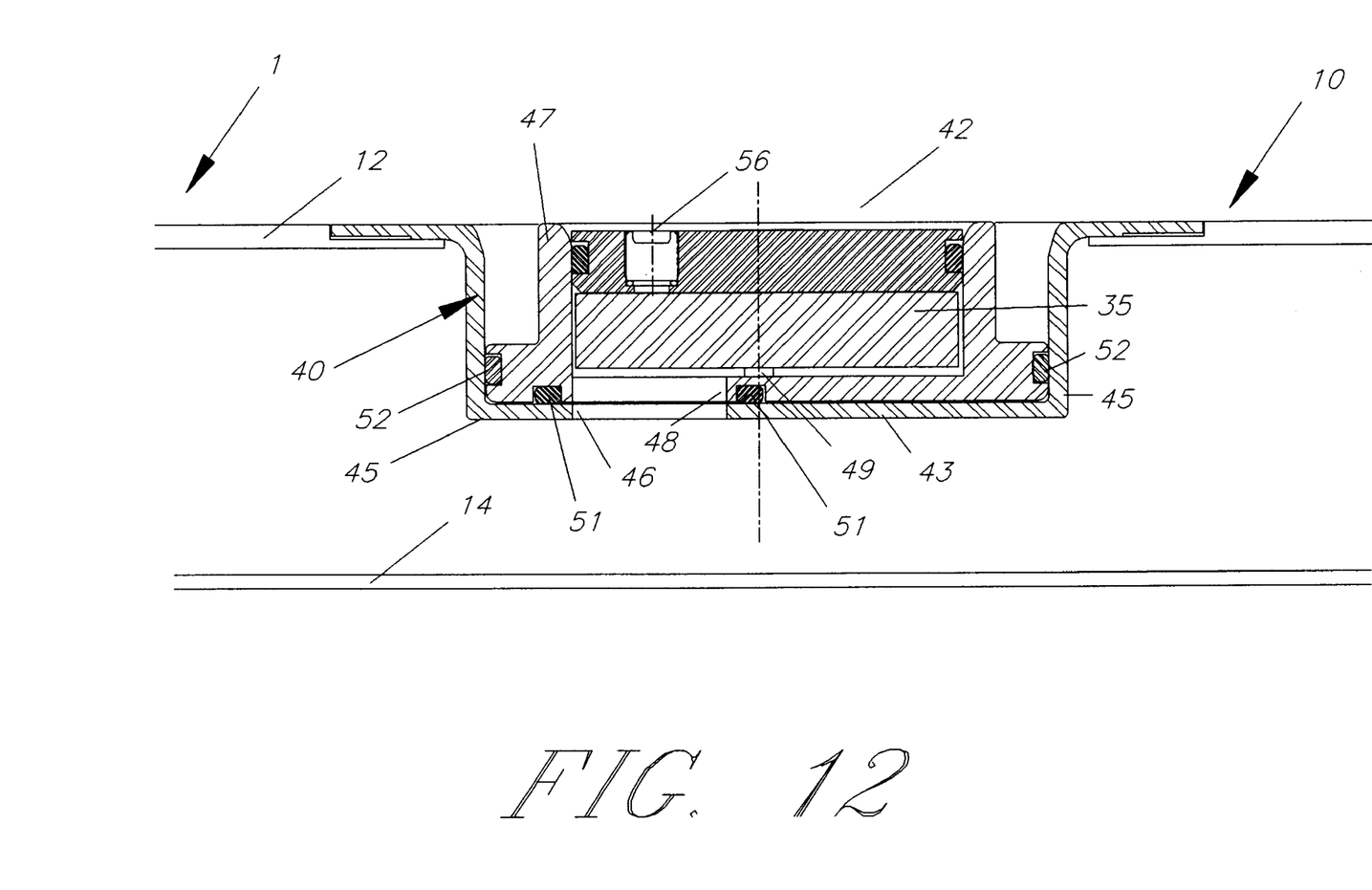
FIG. 12 is a panel with an air lock chamber for supporting the "getter" material having an opening in the bottom of the chamber.

Another aspect of the present invention is to provide a structure within the thermal insulation panel to permit the removal of spent getter material and to replace the material to maintain the vacuum within the panel for long periods of years. The life of a common household appliance which uses thermal insulation, such as a refrigerator, may be over fifteen years. Thermal insulation panels in a house may have a life of over sixty or more years. If the thermal panels were on a space station, the ability of making a replacement of getter material may extend the life of a thermal insulation panel essentially indefinitely. According to this aspect of the present invention, the thermal insulation panel comprises an envelope of a thin skin high gas barrier material which surrounds a thermal barrier and includes a getter material support within and attached to the barrier material. Referring now to FIG. 12, the preferred support 40 is a metal or plastic air lock chamber 42 having a bottom 43 and sides 45. In this embodiment, there is an opening 46 in the bottom of the chamber 42, approximately a third of the size of the bottom 43. In the chamber 42 is a rotatable support chamber 47 which also has an opening 48 in the bottom of the support chamber 47. The support chamber 47 has a pedestal 49 on which the getter material 35 is placed. As shown the openings 46 and 48 are aligned and open to permit any gases which surround the barrier 20 of the panel 1 or which permeate the skins 12 or 14 of the panel 1 to have access to the getter material 35. The top of the support chamber 47 is closed and sealed by a plug 50. The outer dimensions of support chamber 47 are the same as the inner dimensions of chamber 42. Seals 51 and 52 are located on the outer surfaces of the rotatable support chamber 47 on each side of the opening 48 and on the sides, respectively. Thus, on rotation of the support chamber 47 within the chamber 42, the opening 46 may be closed.

Figure 13:
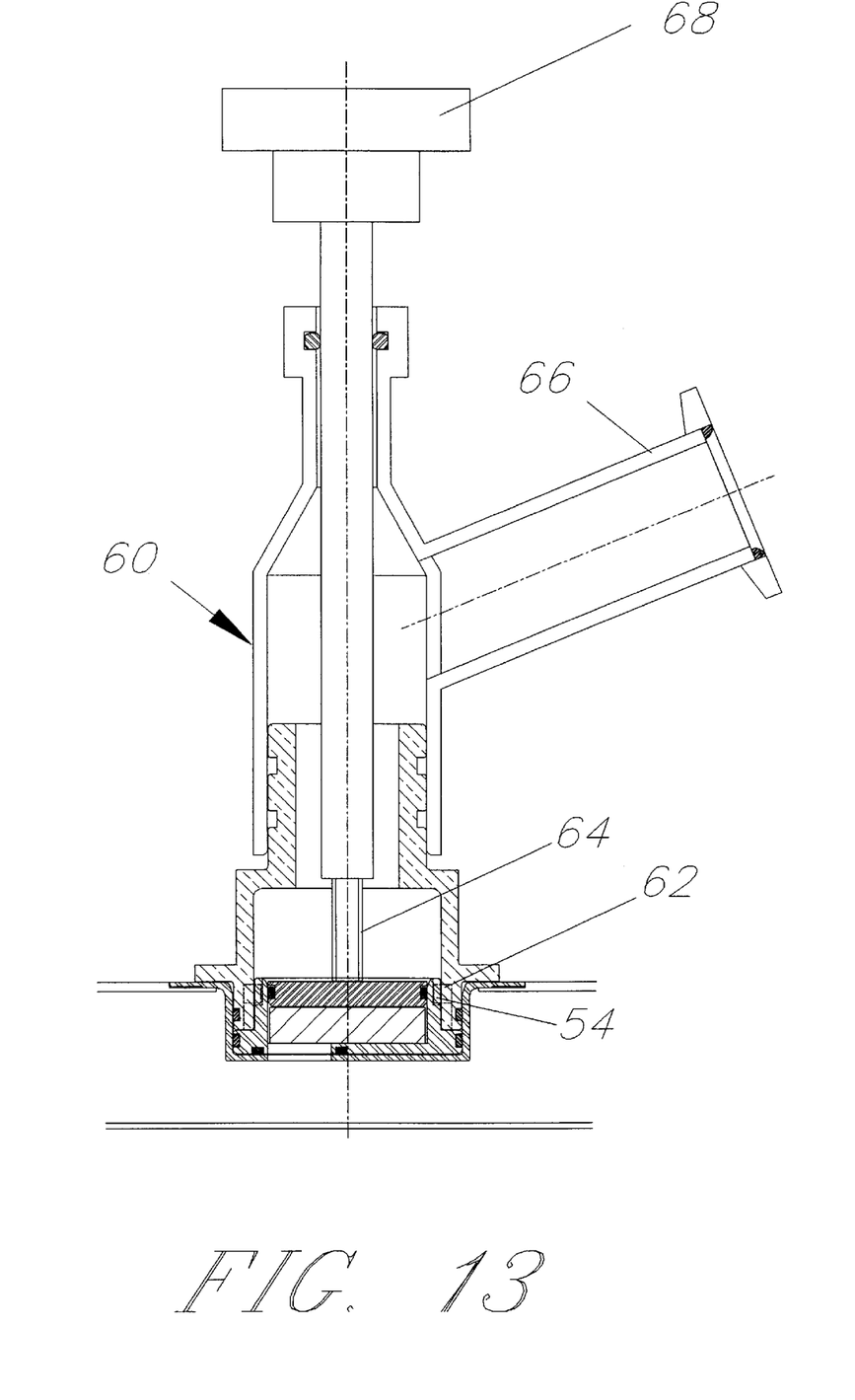
FIG. 13 is a panel with an air lock chamber for supporting the "getter" material having an evacuator device which is used to open and close the opening and replace the "getter" material while maintaining the chamber under vacuum.

The operation of the getter material support 40 and an evacuator device 60 to insert the getter material 35 into support 40 and the removal thereof is illustrated in FIG. 13. The combination of the getter material support 40 and evacuator device 60 is shown in the final operating position of the panel 1. The evacuator device 60 is attached to the getter material support 40 by pins 62 which enter openings 54 in the support chamber 47. If the panel 1 is new, the passageway through the openings 46 and 48 may be used to evacuate the envelope 10 of the panel 1. Upon completion of the evacuation to the desired level of vacuum and rotation of the evacuator device 60, the support chamber 47 rotates within the chamber 42 and closes the opening 46. The evacuator device 60 is then removed. In the event of a new panel 1, there would be no getter material 35 and no plug 50 present and in the event of replacing the getter material, a screw 56 is removed from the plug 50 which releases the vacuum in the chamber 42 to permit removal of the plug 50. New getter material 35 is then inserted onto the pedestal 49. The screw 56 is replaced into the plug 50 and threaded into the end of rod 64 of the evacuator device 60. The pins 62 of evacuator device 60 are reinserted into the openings 54 of the support chamber 47 and a vacuum is drawn through the outlet 66, evacuating the space above the getter material and removing gasses in the support chamber 47. When the vacuum is at the desired level, the rod 64 is lowered by handle 68 to place the plug 50 securely into the top of the support chamber 47 and closing the chamber. The evacuator device 60 is then rotated to align the openings 46 and 48. The panel 1 is then fully operable permitting any gasses in the envelope access to the getter material 35.

Figure 14:
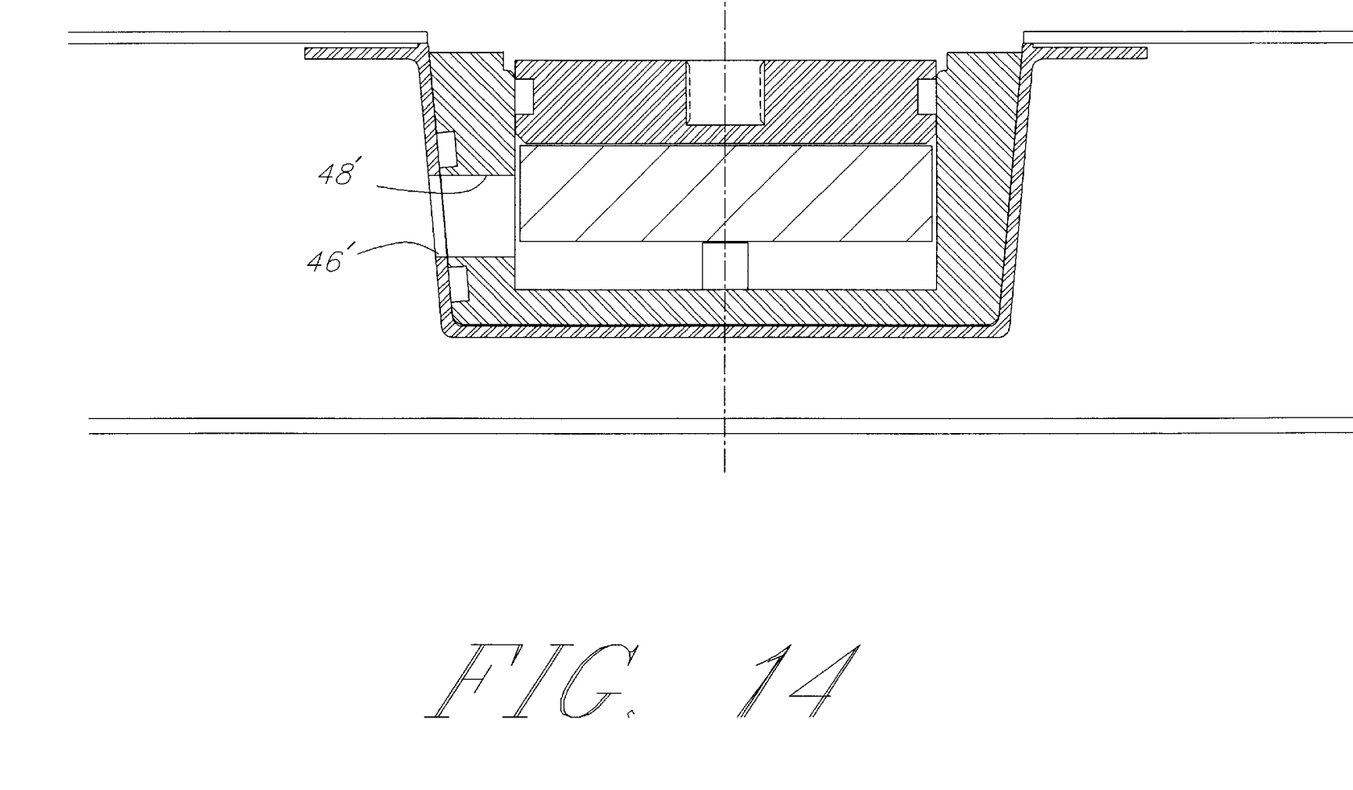
FIG. 14 is a panel with an air lock chamber for supporting the "getter" material having an opening in the side of the chamber.

Referring now to FIG. 14, another embodiment of the support chamber 40 has the opening 46' in the side of chamber 40 rather than the bottom and the support chamber 47 also has an opening 48' in the side. Again rotation of the support chamber 47 causes the opening 46' to be closed or open to the support chamber 47 depending on either non-alignment or alignment of the openings.

The uniqueness of the thermal insulation panels of the present invention are illustrated in the following examples:

EXAMPLE 1

This example illustrates a panel of the present invention where the barrier may be of the prior art but with at least one skin of a liquid crystal polymer. The panel is one-half inch (0.5 inch) or thinner and may be suitable for a refrigerator panel.

At least one panel skin is made from a liquid crystal polymer, VECTRA A-950 made by Hoechst Celanese under the trade name VECTRA which is a high permeation barrier thermoplastic. In one approach, the panel is made where both surfaces are made with VECTRA; however, in a second approach one skin may alternatively be a metal. At least one skin of the panel is thermoformed in a three dimensional piece made of VECTRA A-950 as shown in FIG. 1.

In the first approach where both skins are made of liquid crystal polymer, the second skin is also as shown in FIG. 1. This panel may be used to replace the foam normally used as the insulation in a refrigerator. The advantage is that a panel of 0.5 inches or less can replace 2 inches or more of foam with greatly superior insulation to reduce the energy used to maintain the refrigerator at its desired temperature.

A second approach may use a metal skin as the flat skin of the panel as shown as 14 in FIG. 1; or alternatively, the outer metal wall of the refrigerator may be used as the second panel skin.

The barrier material may be a barrier as illustrated in FIGS. 1 to 4.

In either approach, a refrigerator utilizing less energy and a smaller outside dimension with the same inside capacity or even an increased inside volume is possible with a panel of this example.

EXAMPLE 2

This example illustrates the preferred thermal insulation barriers in a panel of the present invention wherein the thermal insulation elements use two different materials. A panel of light weight (e.g. 0.5 lbs/ft$^2$) construction:

The panel is substantially thinner than one inch (e.g. 0.375 inch) thick.

The panel skins are made from a liquid crystal polymer, VECTRA A-950 made by Hoechst Celanese under the trade name VECTRA which is a high permeation barrier thermoplastic. The panel is made where both surfaces are made with VECTRA; however, one skin may alternatively be a metal such as 300 series stainless steel or aluminum. At least one piece of the thermoplastic is thermoformed into a panel with a flat lip as shown in FIG. 5.

The thermal insulation barrier is made with a minimum of elements; if three elements are used, two compression and one tension then a R value of approximately 75 Ft$^2$-hr-F/Btu-in is obtained; if five elements are used, three compression and two tension then a R value of approximately 100 Ft$^2$-hr-F/Btu-in is obtained.

The thermal insulation elements are extruded from two different materials, amorphous polyetherimide (PEI), a product of GE under the GE trade name Ultem 1000 and polyethylene terephthalate copolyesters (PETG). The compressive thermal insulation elements are made with the PEI. The tension thermal insulation elements are made with the PETG. The PEI and PETG is extruded into film and rolled in widths of 48 inches or more. The film is then aluminized by entrance (either in bulk or fed through the walls) into a vacuum system via evaporative techniques. Each film may be coated on one or both sides.

The aluminized film is then thermoformed via a thermomechanical method wherein the film is heated and run through rotary and complimentary cylinders (with the appearance of meshing gears) to produce the sine-like beam structure as depicted in FIG. 1. The cylinders used to produce the geometric shape having a repetitive three dimensional design for the PEI sheet is not the same but complimentary to that for the PETG. The thermoformed sheets are then cut and trimmed to the size and shape of the desired thermal insulation barrier to be made. The PEI and PETG thermal insulation elements are then stacked to form the desired thermal insulation barrier.

The panel skins and the thermal insulation elements are then assembled in a vacuum chamber which eliminates the need for subsequent evacuation. The flat lip of the thermoformed panel skin provides a surface for bonding the other skin using a thixotropic paste adhesive such as HYSOL EA 934 NA, a product of The Dexter Corp., or welding using friction welding techniques such as ultrasonic, or electroless plated with a copper/nickel system and subsequently soldered together.

A replaceable getter material is introduced to the evacuated region of the panel to maintain the vacuum over a significant time span.

EXAMPLE 3

This example illustrates a panel of the present invention having a very high thermal resistance (i.e. a high R value). A panel one inch thick:

The procedure of Example 2 is followed except that the compressive thermal insulation elements, the tension thermal insulation elements and panel skins are all made of liquid crystal polymer, Vectra A-950 made by Hoechst Celanese. The thermal insulation barrier has between 10 to 40 layers of the alternately stacked compressive thermal insulation elements and tension thermal insulation elements. The sheets of the liquid crystal polymer are thermoformed such that the extruded machine direction is in the direction of the beams.

EXAMPLE 4

This example illustrates a panel of the present invention having the inner or outer skin, or both, formed to have the same design as one of the thermal insulation elements of the thermal insulation barrier in the panel. A semi-flexible panel:

The procedure of Example 3 is followed, the compressive thermal insulation elements, the tension thermal insulation elements and panel skins are all made of liquid crystal polymer, Vectra A-950 made by Hoechst Celanese, except that at least one skin is formed to produce the sine-like beam structure as depicted in FIG. 8. The panel skin is thicker than the thermal insulation elements and is cut so as to be longer than the thermal insulation elements of the thermal insulation barrier. If used in the configuration of FIG. 8, the skin may replace the outermost compressive thermal insulation element of the thermal insulation barrier, i.e. the first element of the thermal insulation barrier is a tension element. The use of an outer skin thus has the accordion-like surface that can be compressed or stretched without incurring high stresses on the skin. Alternatively, the panel skin which is formed to conform to the design of the thermal insulation barrier may be on one or both sides and may be formed as the compression or tension member.

These panels are formed for application around cylinders or formed with a curved geometry suitable for spheres.

It is understood that other combinations or the combination of the structures illustrated are within the spirit of the invention as set forth in the following claims.

We claim:

1. An insulation panel capable of being evacuated which comprises:

an envelope of thin skin high gas barrier material;

a thermal insulation barrier which supports said skin, said skin surrounding said barrier and is evacuated; and a getter material support within said envelope, said support comprising an air lock chamber having a bottom and sides which supports said getter material and having an opening therein which is within said envelope and when open permits the gases surrounding said insulation barrier access to said getter material, rotatable means for closing said opening and means which open and close the top of said chamber.

2. An insulation panel capable of being evacuated according to claim 1 wherein said opening in said chamber is in the bottom of said chamber.

3. An insulation panel capable of being evacuated according to claim 1 wherein said opening in said chamber is in the side of said chamber.

4. An insulation panel capable of being evacuated according to claim 1 which further includes an evacuator device.

5. An insulation panel capable of being evacuated according to claim 4 wherein said evacuator device opens and closes said opening in said chamber.

6. An insulation panel capable of being evacuated according to claim 4 wherein said evacuator device includes means for replacing the getter material in said chamber while maintaining a vacuum in said chamber.

7. An insulation panel capable of being evacuated according to claim 4 wherein said air lock chamber is metal and is sealed to said envelope of thin skin high gas barrier material.

* * * * *